United States Patent [19]

Smith

[11] 4,266,798
[45] May 12, 1981

[54] PUSH-PULL COUPLING FOR POWER SCRAPERS

[75] Inventor: Roger M. Smith, Joliet, Ill.

[73] Assignee: Caterpillar Tractor Co., Peoria, Ill.

[21] Appl. No.: 11,990

[22] Filed: Feb. 14, 1979

[51] Int. Cl.³ .............................................. B60D 1/04
[52] U.S. Cl. .................................. 280/481; 180/14 R
[58] Field of Search .............. 280/481, 477, 504, 514, 280/483, 486; 180/14 R

[56] References Cited

U.S. PATENT DOCUMENTS

| 1,462,921 | 7/1923 | Reichmann | 280/514 |
| 3,434,738 | 3/1969 | Campbell | 280/477 |
| 3,606,388 | 9/1971 | Campbell | 280/477 |
| 3,740,080 | 6/1973 | Kuhl | 280/481 |
| 3,977,699 | 8/1976 | Wagatsuma | 280/481 |
| 4,018,452 | 4/1977 | Wagatsuma | 280/481 |

Primary Examiner—John P. Silverstrim
Attorney, Agent, or Firm—Wegner, Stellman, McCord, Wiles & Wood

[57] ABSTRACT

A push-pull coupling (18) for wheel supported power scrapers (10 and 14) has a coupling means (26) supported for cushioned fore-and-aft movement in a mounting frame (21) at the rear of a first power scraper (10) and a power operated bail (39) at the front of a second power scraper (14). The coupling means (26) has a rearwardly facing hook (37) against which a bight (39a) of the bail (39) may push, and a forwardly facing hook (38) against which the bight (39a) of the bail (39) may pull.

6 Claims, 4 Drawing Figures

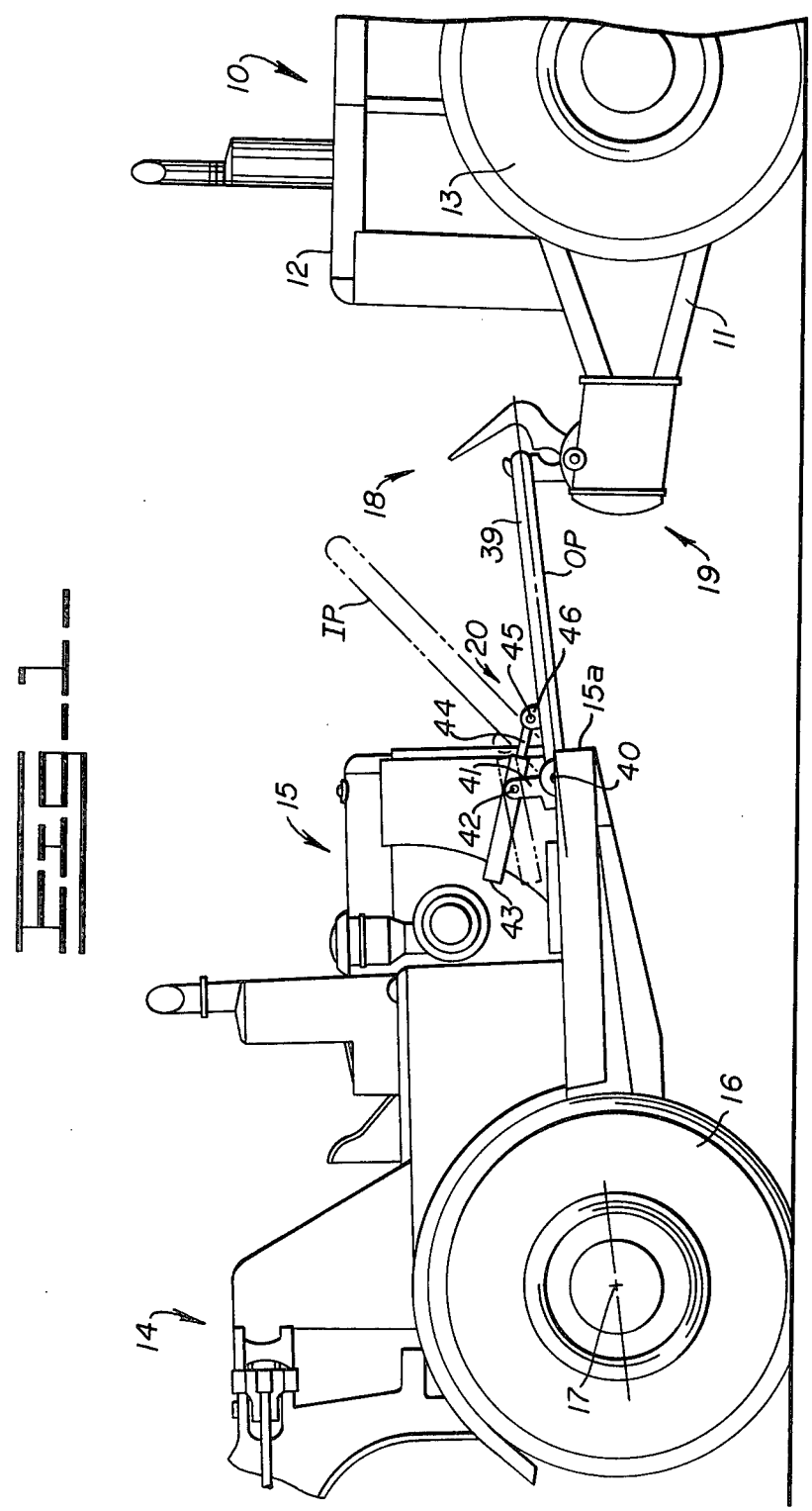

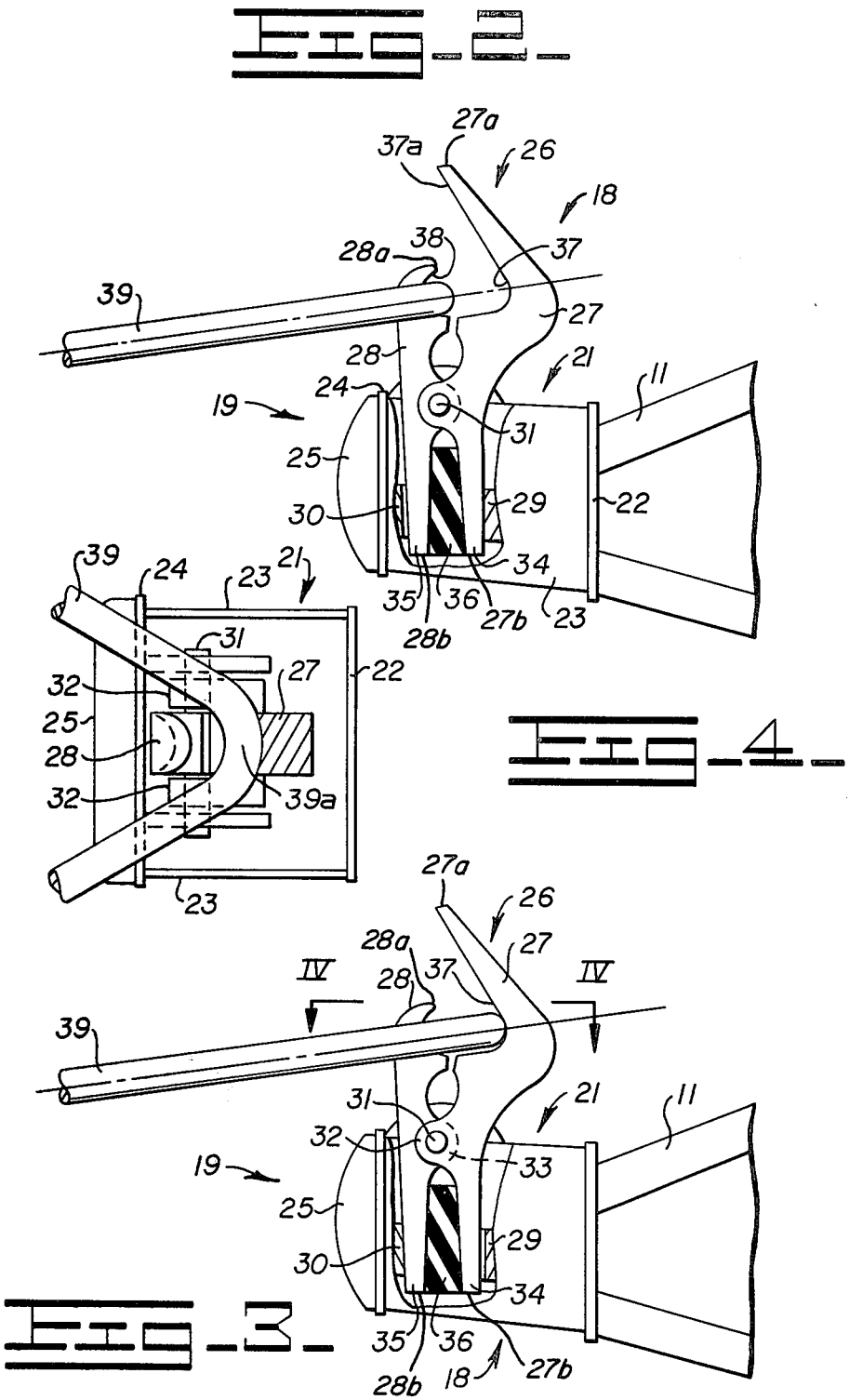

PUSH-PULL COUPLING FOR POWER SCRAPERS

DESCRIPTION

1. Technical Field

This invention relates to a push-pull coupling by which two wheel supported power scrapers may be temporarily coupled to one another for push-pull operation.

2. Background Art

Push-pull loading of power scrapers is well known, and is a desirable mode of operation because it doubles the power available for loading each of two scraper bowls, so that it is particularly helpful under adverse loading conditions.

In push-pull loading, a trailing scraper pushes a leading scraper while the latter is loading; and then the leading scraper pulls while the trailing scraper is loading. Thus each of the two scrapers has the benefit of a second power unit during loading. However, when both scrapers are loaded, they may be disconnected and moved independently between the site of the cut and the site of the fill. In most cases the scrapers are an identical pair, but need not be.

Prior art mechanisms for push-pull coupling of power scrapers have included a hook on the rear of the leading unit and a bail on the front of the trailing unit which is power operated to move it between an elevated idle position and a lowered position in which it may be engaged by the hook for pull loading. Push loading has always been accomplished by a large pusher pad at the rear of the leading scraper and a complementary pusher pad at the front of the trailing scraper. This produces considerable overhung weight at the front of the trailing scraper; and also requires a cushioning mechanism behind the forward pusher pad on the trailing scraper.

There are some prior art systems in which the hook for pulling is on the front of the trailing scraper while the bail is on the rear of the leading scraper; and in those cases, also, pushing is accomplished by complementary pads on the rear and the front of the two scrapers.

In addition, since the hook and bail for pull operation and the complementary pads for push operation must be in different planes, in one mode or the other, and frequently in both modes, the pullng forces tend to lift the wheels of the pulled tractor; and the pushing forces tend to lift the wheels of the pushed scraper.

Typical prior art push-pull couplings are illustrated in U.S. Pat. Nos. 3,434,738; 3,606,388; 3,740,080; 3,977,699; and 4,018,452.

DISCLOSURE OF INVENTION

The present invention is directed to overcoming one or more of the problems as set forth above.

According to the present invention, a push-pull coupling for first and second wheel supported power scrapers has a mounting frame fixedly secured to the rear of the first power scraper, and a two-way coupling means supported in the frame for limited fore-and-aft movement. The coupling means has an upstanding rearwardly open bail engaging hook and an upstanding forwardly open bail engaging hook, and a resilient means cushions the thrust of the coupling means against the mounting frame when the coupling means is moved either way by engagement of one of said hooks with a bail of the second wheel supported power scraper during push-pull operation of the two power scrapers.

BRIEF DESCRIPTION OF DRAWINGS

FIG. 1 is a fragmentary side elevational view of two power scrapers coupled for push-pull operation by means of the coupling of the present invention;

FIG. 2 is a fragmentary side elevational view of an enlarged scale, with parts broken away, illustrating the push-pull coupling in the pulling mode;

FIG. 3 is a view like FIG. 2 illustrating the coupling in the pushing mode; and

FIG. 4 is a fragmentary sectional view taken substantially as indicated along the line IV—IV of FIG. 3.

BEST MODE FOR CARRYING OUT THE INVENTION

Referring to the drawings, and referring first to FIG. 1, a first, or leading wheel supported power scraper, indicated generally at 10, includes a frame 11 and rear scraper engine 12 supported upon wheels 13. A second, or trailing wheel supported power scraper, indicated generally at 14, includes a tractor 15 supported upon a pair of wheels 16 which rotate about an axis 17. In practice, of course, the first power scraper 10 has a scraper blade and bowl forward of the rear engine 12 and has a two-wheel tractor unit like the unit 15 at the front; while the second power scraper 14 also includes a scraper blade and bowl with a rear engine like the engine 12; so there are two similar scrapers which may be coupled for quick cooperation by means of the coupling of the present invention which is indicated generally at 18.

The coupling 18 of the present invention consists generally of a rear coupling assembly, indicated generally at 19, which is fixedly secured to the rear of the frame 11 of the first power scraper 10; and a bail mechanism, indicated generally at 20, which is mounted upon the front of a frame 15a of the two-wheel tractor 15.

Referring now to FIGS. 2-4, the rear coupling assembly 19 includes a mounting frame 21 which has a front plate 22 welded to the frame 11, side plates 23 and a back plate 24 which carries a pushing pad 25 so the power scraper 10 can be used for push-pull operation with a prior art type of power scraper having a pusher pad at the front of the tractor.

The rear coupling assembly 19 also includes a two-way coupling means, indicated generally at 26, having an upper end 26a and a lower end 26b. The coupling means includes a first coupling element 27 having an upper end 27a and a lower end 27b, and a second coupling element 28 both of which having an upper end 28a and a lower end 28b. The elements 27 and 28 are supported for limited fore-and-aft movement between stop plates 29 and 30 by mounting them for independent pivotal movement about a common transverse pivot 31. The first coupling element 27 has spaced mounting bosses 32 which flank a central mounting boss 33 on the coupling element 28; and the coupling elements 27 and 28 having facing lower portions 34 and 35, respectively, between which is mounted a block of resilient elastomer 36 which cushions the thrust of the coupling means 26 against either of the stops 29 and 30 when the coupling means is moved either way about the pivot 31 during push-pull operation.

The first coupling element 27 has its upper end portion formed to provide a rearwardly open bail engaging hook 37; and the second coupling element 28 has its upper end portion shaped to provide a forwardly open bail engaging hook 38. The hook 37 has an extended upper extremity 37a which minimizes any likelihood that the bail will override the hook 37 in the pushing mode.

Referring now again to FIG. 1, the bail mechanism 20 includes a bail 39 which is pivotally mounted at 40 by upstanding bosses which are on the tractor frame 15a. A boss 41 on the tractor frame provides a pivotal mount 42 for a hydraulic cylinder 43 that has a piston 44 pivotally connected at 45 to a boss 46 on the bail 39. The hydraulic cylinder 43 furnishes power means for pivoting the bail 39 between an elevated idle position IP which is illustrated in broken lines in FIG. 1, and an operative position OP which is illustrated in full lines in FIG. 1.

INDUSTRIAL APPLICABILITY

In anything but push-pull operation of a power scraper, the bail 39 is kept in its elevated, idle position IP. When the scraper is to be used as the trailing, or second, scraper 14 in push-pull operation it is moved into the position of FIG. 1 and its hydraulic cylinder 43 is extended to move the bail 39 to the operative position OP where a bight 39a of the bail is between the hooks 37 and 38.

In the pushing mode, the bail 39 bears against the hook 37; and the thrust of the coupling means 26 against the mounting frame 21 is cushioned by the resilient block 36 of elastomer.

In the pulling mode, the hook 38 engages the bight 39a of the bail 39; and the thrust of the coupling means 26 against the mounting frame 21 is again cushioned by the resilient block 36 of elastomer. It is seen from FIG. 2 that in the pulling mode the lower end portion 34 of the coupling element 27 bears against the confining stop 29; while in the pushing mode the lower portion 35 of the coupling element 28 bears against the confining stop 30.

It is seen, therefore, that the present invention considerably reduces the overhung weight at the front of the second scraper tractor 15 which is necessitated by the heavy pusher pad, and further reduces such overhung weight by eliminating any need for a cushioning mechanism behind that pusher pad.

Other aspects, objects and advantages of this invention can be obtained from a study of the drawings, the disclosure and the appended claims.

The foregoing detailed structural description and operational description are given for clearness of understanding only, and no unnecessary limitations should be understood therefrom, as modifications will be obvious to those skilled in the art.

I claim:

1. In a first, wheel supported, push-pull vehicle (10) having a mounting frame (21) fixedly secured to the rear thereof, for use with a second, wheel supported vehicle (14) having a bail (39) pivotally mounted to the front thereof, the improvement comprising:
    a first upstanding coupling element (27) having upper (27a) and lower (27b) ends, one of said ends including a rearwardly opened, bail engaging hook (37);
    a second upstanding coupling element (28) having upper (28a) and lower (28b) ends, one of said ends of said second element including a forwardly opened, bail engaging hook (38);
    means for independently pivoting said first and second coupling elements on said mounting frame about a common transverse axis (31) between said upper and lower ends;
    and resilient means (36) supported by said mounting frame for engaging the other of said ends of said first and second coupling elements, whereby one of said coupling elements is engaged by said bail for pushing of said first vehicle by said second vehicle and the other of said coupling elements is engaged by said bail for pulling of said second vehicle by said first vehicle, said resilient means cushioning the thrust of said coupling elements against said mounting frame as they are independently pivoted by respective pushing or pulling engagement with said bail.

2. The improvement of claim 1 in which the rearwardly opened bail engaging hook (37) and the forwardly opened bail engaging hook (38) are substantially in the same horizontal plane, so that in a single position relative to the hooks (37 and 38) the bail (39) may be engaged selectively either for pushing of said first vehicle by said second vehicle or for pulling of said second vehicle by said first vehicle.

3. The improvement of claim 1 in which said common transverse axis (31) is provided by a pivot upon which said first (27) and second (28) coupling elements are independently mounted for pivotal movement.

4. The improvement of claim 1 in which said coupling elements (27 and 28) have facing portions (34 and 35) adjacent their respective ends which are to the side of said common transverse axis (31) opposite said respective opened bail engaging hooks (37 and 38), and in which said resilient means (36) is between said facing portions (34 and 35).

5. The improvement of claim 1 in which the rearwardly opened bail engaging hook (37) and the forwardly opened bail engaging hook (38) face one another.

6. The improvement of each of the preceding claims in which the bail engaging hooks (37 and 38) are both at the upper ends (27a and 28a) of their respective coupling elements (27 and 28).

* * * * *